Figure 1:
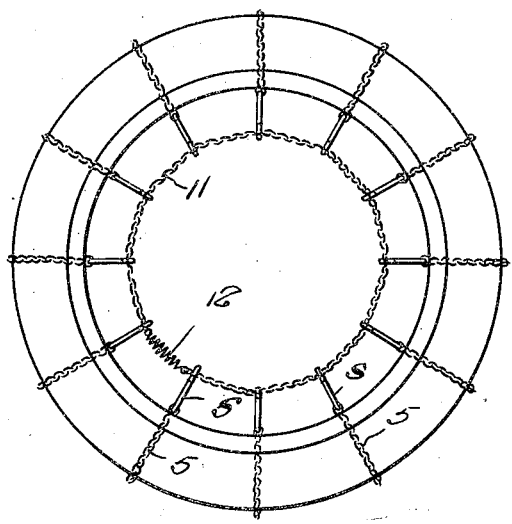

July 30, 1929.  C. KIRKWOOD  1,722,526

ANTISKID TIRE CHAIN

Filed Jan. 19, 1928

Inventor
Charles Kirkwood,

By Clarence A. O'Brien
Attorney

Patented July 30, 1929.

1,722,526

UNITED STATES PATENT OFFICE.

CHARLES KIRKWOOD, OF MANSFIELD, OHIO.

ANTISKID TIRE CHAIN.

Application filed January 19, 1928. Serial No. 247,907.

The present invention relates to an anti-skid tire chain particularly adapted for use upon pneumatic tires and has for its prime object to provide a structure which may be easily placed in proper relation with the tire without the necessity of jacking up the wheel or running the wheel on the chain such as is necessary with the anti-skid tire chain now in common use.

Another very important object of the invention resides in the provision of a tire chain of this nature made up of a plurality of sections which may be quickly engaged about the tire to form cross chains.

Another important object of the invention resides in the provision of a novel device for holding the cross chains in place.

A still further important object of the invention resides in the provision of a tire chain of this nature which is exceedingly simple in its construction, strong and durable, inexpensive to manufacture, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
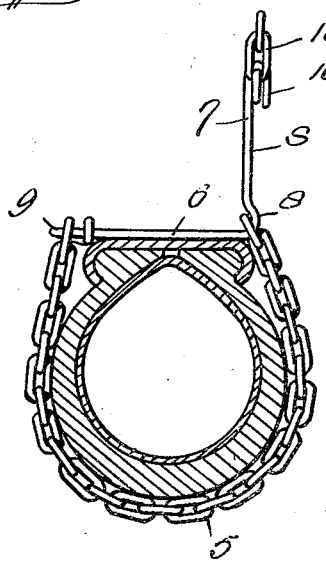
Figure 3:
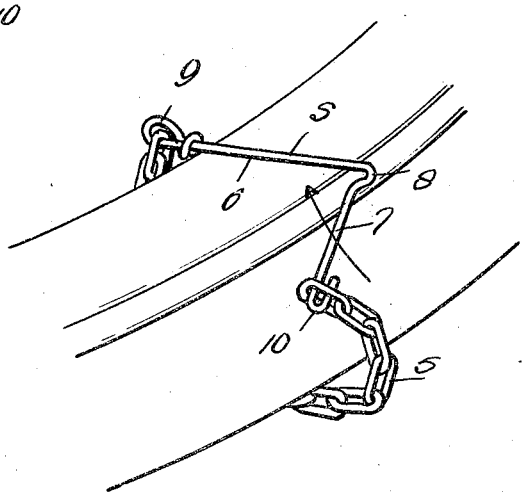

In the drawing:

Figure 1 is a side elevation of a tire rim showing my chain structure applied thereto, Figure 2 is a detail transverse section therethrough, and Figure 3 is a fragmentary perspective view showing one of the cross chains partly applied to the tire.

Referring to the drawing in detail it will be seen that numerals 5 denote a plurality of cross chains with each of which is associated a securing device generally denoted by the letter S. The securing device S is in the form of a rod bent to provide an arm 6 and an arm 7 preferably at right angles thereto and joined thereto by a bight 8. The arm 6 terminates in a loop 9 while the arm 7 terminates in a hook 10. The loop 9 is engaged with one end link of the cross chain 5. The arm 9 is inserted through the other end link of the cross chain as is indicated in Figure 3, the arm 6 crossing the felly or rim of the wheel at each side thereof. The said other end link of the chain is adapted to rest in the bight 8 as is indicated in Figure 2 while the arm 7 radiates inwardly from the wheel. A chain 11 is engaged in the hook 10 and the ends of the chain 11 are secured together by a spring 12. Of course the member of the cross chain 5 will vary in accordance with the diameter of the tire and will be spaced apart the desired distance. It will be seen that the cross chain 5 may be applied to the wheel without jacking the wheel up and also without the necessity of running the wheel on the chain. The rocking of the legs or arms 6 from the position shown in Figure 3 to the position shown in Figure 2 will tend to tighten the cross chain 5 of the tire and the chain 11 will hold the arms 7 in their inwardly radiating position as indicated in Figure 1.

It is thought that the construction, utility and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An anti-skid chain structure of the class described comprising a plurality of cross chains, rods bent intermediate their ends to provide angular arms one of which is secured to one end of each cross chain and the other arm being adapted to pass through the link at the other end of the chain, and terminating in a hook, and a chain engaged with the hooks for holding said arms radiating inwardly.

In testimony whereof I affix my signature.

CHARLES KIRKWOOD.